(12) United States Patent
Diaz

(10) Patent No.: US 6,347,727 B1
(45) Date of Patent: Feb. 19, 2002

(54) FOOD DISPENSING FEEDING SYSTEM

(76) Inventor: Cynthia M. Diaz, 2505 Meraux La. Apt. C, Violet, LA (US) 70092

( * ) Notice: Subject to any disclaimer, the term of this patent is extended or adjusted under 35 U.S.C. 154(b) by 0 days.

(21) Appl. No.: 09/707,341

(22) Filed: Nov. 6, 2000

(51) Int. Cl.[7] ............................................. B65D 35/28
(52) U.S. Cl. .................. 222/101; 222/192; 222/205; 222/541.9; 222/106; 30/141; 426/115
(58) Field of Search ................................. 222/103, 106, 222/105, 192, 205, 541.6, 541.9, 101; 30/141; 426/115

(56) References Cited

U.S. PATENT DOCUMENTS

| | | | |
|---|---|---|---|
| 2,801,028 A | * 7/1957 | Ward et al. | 222/101 |
| 2,848,141 A | * 8/1958 | Intagliata | 222/101 |
| 3,116,152 A | * 12/1963 | Smith | 99/171 |
| 3,154,418 A | * 10/1964 | Lovell et al. | 99/77.1 |
| 4,830,222 A | * 5/1989 | Read | 222/106 |
| 4,880,409 A | 11/1989 | Winblad et al. | 604/73 |
| 4,888,188 A | * 12/1989 | Castner, Sr. et al. | 426/109 |
| 4,957,226 A | 9/1990 | Pacia | 222/643 |
| 5,038,974 A | * 8/1991 | DaCosta | 222/106 |
| 5,377,879 A | 1/1995 | Isaacs | 222/205 |
| 5,491,895 A | 2/1996 | Lee | 30/125 |
| 5,946,807 A | 9/1999 | Crane et al. | 30/141 |
| 5,975,305 A | * 11/1999 | Barger | 206/572 |
| 5,992,667 A | * 11/1999 | Huang | 220/212 |

* cited by examiner

Primary Examiner—Kevin Shaver
Assistant Examiner—Melvin A. Cartagena
(74) Attorney, Agent, or Firm—Joseph N. Breaux

(57) ABSTRACT

A feeding system for feeding infants and other individuals who must be fed by another. The feeding system includes a number of small packets, much like catsup or mustard packets, that are filled with food, such as baby food, and which is attachable to a feeding spoon mechanism provided with the system. Once attached to the feeding spoon mechanism, the food within the packet is forced out of the packet into the bowl of the spoon mechanism by the user using only a single hand. The feeding system thus allows the user to have one hand remain free to hold the baby, a baby bib or perform other necessary baby care activities.

4 Claims, 3 Drawing Sheets

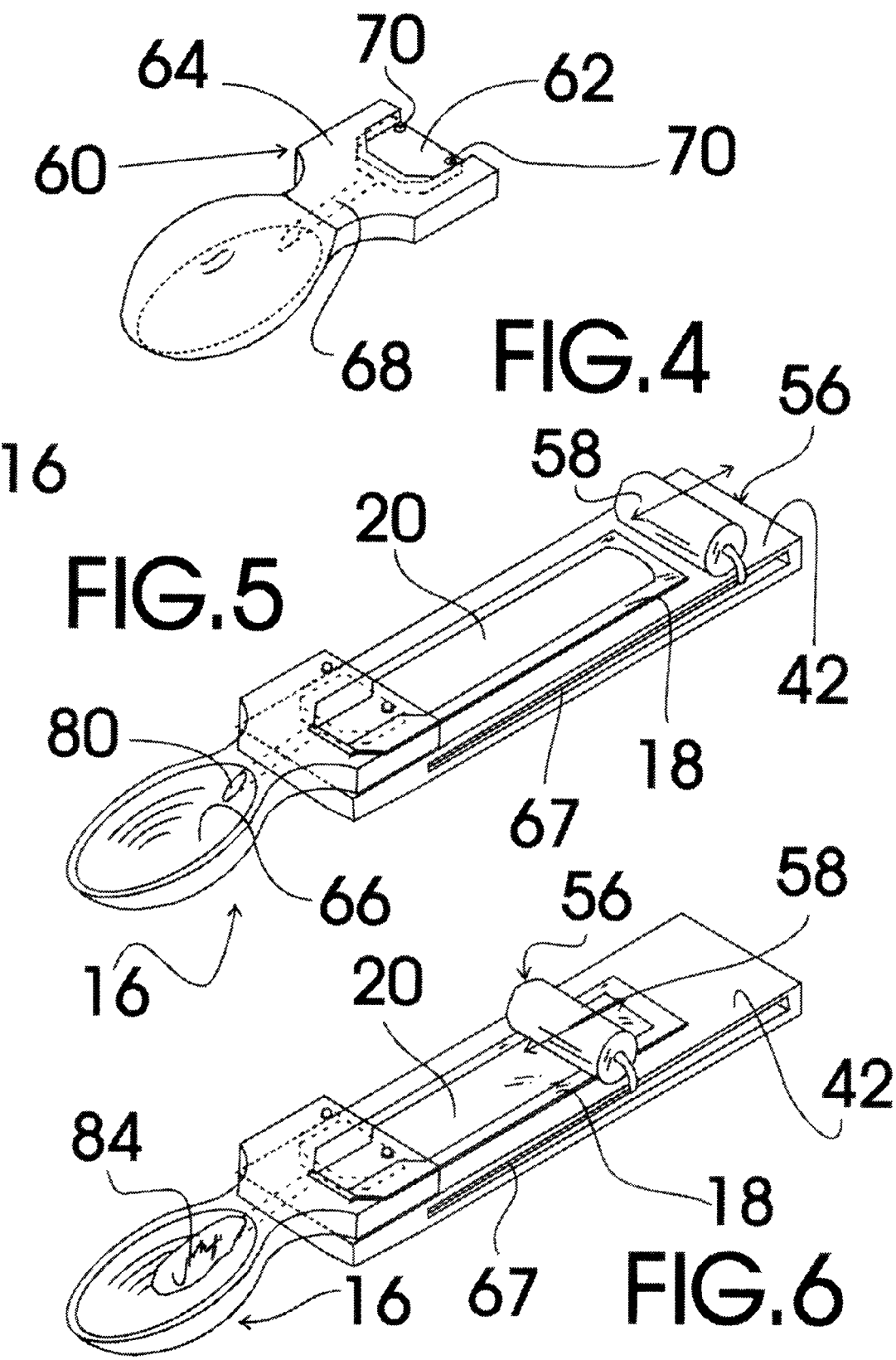

FOOD DISPENSING FEEDING SYSTEM

TECHNICAL FIELD

The present invention relates to feeding systems for feeding infants and other individuals who must be fed by another and more particularly to a food dispensing feeding system that includes a food package assembly, a handle assembly and a spoon bowl assembly; the food package assembly including a sealed plastic film structure having an inner compartment filled with a food product that has a tapered interior compartment end adjacent to a handle connecting end of the sealed plastic film structure provided with spaced securing holes one formed through a solid section of the sealed plastic film structure on each side of the tapered interior compartment end and a tear notch positioned between a tab portion of the handle connecting end and a line connecting the spaced securing holes such that, when a tab portion of the handle connecting end is grasped and torn away from the sealed plastic film structure along a line beginning at the vertex of the tear notch and parallel to a tab portion of the handle connecting end, a dispensing opening is formed in connection with the tapered interior compartment end of the inner compartment and the spaced securing holes remain part of the sealed plastic film structure; the handle assembly including a spoon connecting end and an elongated handle section; the spoon connecting end having a pair of spaced upwardly extending spoon/film structure securing spikes having enlarged tip end portions spaced and which are positioned to extend through the spaced securing holes of the sealed plastic film structure; the elongated handle section being sized to receive on film structure support surface thereof the sealed plastic film structure and including a compression mechanism having a compression member in slidable connection with the elongated handle section and positioned away from film structure support surface such that the compression member is slidable toward the spoon connecting end to generate a compressing force against the sealed plastic film structure positioned between the film structure support surface and the compression member of sufficient magnitude to force food from the inner compartment out through the dispensing opening; the spoon bowl assembly including an attachment structure including a dispensing opening receiving cavity formed into a handle contacting surface thereof, a spoon bowl in fluid communication with the dispensing opening receiving cavity through a bowl feed passageway formed between the spoon bowl and the dispensing opening receiving cavity and a pair of spaced spoon assembly connecting passageways spaced and dimensioned to receive therethrough the enlarged tip end portions of the spoon/film structure securing spikes such that the attachment structure is firmly held in place to provide a compressing gripping force against the sides of the sealed plastic film structure; food from the inner compartment being forced out of the sealed plastic film structure into the spoon bowl through a bowl opening of the bowl feed passageway.

BACKGROUND ART

It is often difficult when feeding an infant or other individual who must be fed by another to refill the feeding spoon by dipping it into a bowl, jar or other container for holding the food because the container can become knocked over and spilled causing a mess and wasting food. In addition, because babies often eat often and in small amounts, it would be a further benefit to have a feeding system that included small packets, much like catsup or mustard packets, that were filled with baby food and which could be attached to a feeding spoon mechanism whereby the food within the packet could simultaneously be portion control dispensed out into the bowl of the spoon while feeding the baby with one hand thus allowing the other hand to remain free to hold the baby, a baby bib or perform other necessary baby care activities.

GENERAL SUMMARY DISCUSSION OF INVENTION

It is thus an object of the invention to provide a food dispensing feeding system that includes a food package assembly, a handle assembly and a spoon bowl assembly; the food package assembly including a sealed plastic film structure having an inner compartment filled with a food product that has a tapered interior compartment end adjacent to a handle connecting end of the sealed plastic film structure provided with spaced securing holes one formed through a solid section of the sealed plastic film structure on each side of the tapered interior compartment end and a tear notch positioned between a tab portion of the handle connecting end and a line connecting the spaced securing holes such that, when a tab portion of the handle connecting end is grasped and torn away from the sealed plastic film structure along a line beginning at the vertex of the tear notch and parallel to a tab portion of the handle connecting end, a dispensing opening is formed in connection with the tapered interior compartment end of the inner compartment and the spaced securing holes remain part of the sealed plastic film structure; the handle assembly including a spoon connecting end and an elongated handle section; the spoon connecting end having a pair of spaced upwardly extending spoon/film structure securing spikes having enlarged tip end portions spaced and which are positioned to extend through the spaced securing holes of the sealed plastic film structure; the elongated handle section being sized to receive on film structure support surface thereof the sealed plastic film structure and including a compression mechanism having a compression member in slidable connection with the elongated handle section and positioned away from film structure support surface such that the compression member is slidable toward the spoon connecting end to generate a compressing force against the sealed plastic film structure positioned between the film structure support surface and the compression member of sufficient magnitude to force food from the inner compartment out through the dispensing opening; the spoon bowl assembly including an attachment structure including a dispensing opening receiving cavity formed into a handle contacting surface thereof, a spoon bowl in fluid communication with the dispensing opening receiving cavity through a bowl feed passageway formed between the spoon bowl and the dispensing opening receiving cavity and a pair of spaced spoon assembly connecting passageways spaced and dimensioned to receive therethrough the enlarged tip end portions of the spoon/film structure securing spikes such that the attachment structure is firmly held in place to provide a compressing gripping force against the sides of the sealed plastic film structure; food from the inner compartment being forced out of the sealed plastic film structure into the spoon bowl through a bowl opening of the bowl feed passageway.

Accordingly, a food dispensing feeding system is provided. The food dispensing feeding system includes a food package assembly, a handle assembly and a spoon bowl assembly; the food package assembly including a sealed plastic film structure having an inner compartment filled with a food product that has a tapered interior compartment end adjacent to a handle connecting end of the sealed plastic film structure provided with spaced securing holes one formed through a solid section of the sealed plastic film structure on each side of the tapered interior compartment end and a tear notch positioned between a tab portion of the handle connecting end and a line connecting the spaced securing holes such that, when a tab portion of the handle connecting end is grasped and torn away from the sealed plastic film structure along a line beginning at the vertex of the tear notch and parallel to a tab portion of the handle connecting end, a dispensing opening is formed in connection with the tapered interior compartment end of the inner compartment and the spaced securing holes remain part of the sealed plastic film structure; the handle assembly including a spoon connecting end and an elongated handle section; the spoon connecting end having a pair of spaced upwardly extending spoon/film structure securing spikes having enlarged tip end portions spaced and which are positioned to extend through the spaced securing holes of the sealed plastic film structure; the elongated handle section being sized to receive on film structure support surface thereof the sealed plastic film structure and including a compression mechanism having a compression member in slidable connection with the elongated handle section and positioned away from film structure support surface such that the compression member is slidable toward the spoon connecting end to generate a compressing force against the sealed plastic film structure positioned between the film structure support surface and the compression member of sufficient magnitude to force food from the inner compartment out through the dispensing opening; the spoon bowl assembly including an attachment structure including a dispensing opening receiving cavity formed into a handle contacting surface thereof, a spoon bowl in fluid communication with the dispensing opening receiving cavity through a bowl feed passageway formed between the spoon bowl and the dispensing opening receiving cavity and a pair of spaced spoon assembly connecting passageways spaced and dimensioned to receive therethrough the enlarged tip end portions of the spoon/film structure securing spikes such that the attachment structure is firmly held in place to provide a compressing gripping force against the sides of the sealed plastic film structure; food from the inner compartment being forced out of the sealed plastic film structure into the spoon bowl through a bowl opening of the bowl feed passageway.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 4 is perspective underside view of the spoon bowl assembly showing the dispensing opening receiving cavity formed into a handle contacting surface thereof and the pair of spaced spoon assembly connecting passageways.

FIG. 5 is a perspective view of the exemplary food dispensing feeding system of FIG. 1 with the food package assembly gripped between the handle assembly and the spoon bowl assembly; the compression member of the compression mechanism being fully retracted prior to squeezing the contents of the food package assembly out into the spoon bowl of the spoon assembly through the bowl opening of the bowl feed passageway.

FIG. 6 is a perspective view of the exemplary food dispensing feeding system of FIG. 5 with the food package assembly gripped between the handle assembly and the spoon bowl assembly; the compression member of the compression mechanism being partially rolled forward to squeeze some of the contents of the food package assembly out into the spoon bowl of the spoon assembly through the bowl opening of the bowl feed passageway.

EXEMPLARY MODE FOR CARRYING OUT THE INVENTION

Figure 1:
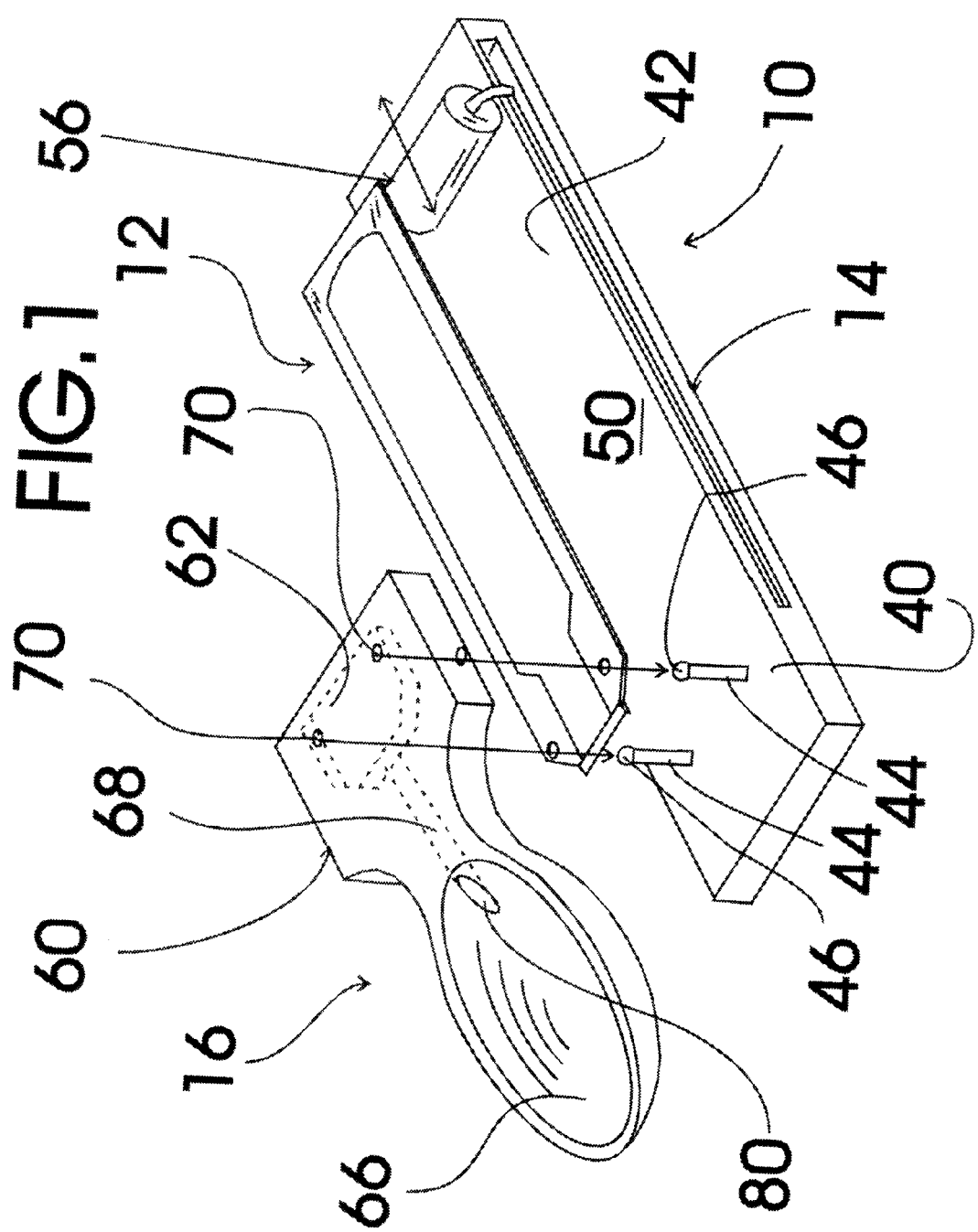
FIG. 1 is an exploded perspective view of an exemplary embodiment of the food dispensing feeding system of the present invention showing the food package assembly, the handle assembly and the spoon bowl assembly; food package assembly including a sealed plastic film structure having an inner compartment filled with a food product that has a tapered interior compartment end adjacent to a handle connecting end of the sealed plastic film structure provided with spaced securing holes one formed through a solid section of the sealed plastic film structure on each side of the tapered interior compartment end and a tear notch positioned between a tab portion of the handle connecting end and a line connecting the spaced securing holes such that, when a tab portion of the handle connecting end is grasped and torn away from the sealed plastic film structure along a line beginning at the vertex of the tear notch and parallel to a tab portion of the handle connecting end, a dispensing opening is formed in connection with the tapered interior compartment end of the inner compartment and the spaced securing holes remain part of the sealed plastic film structure; the handle assembly including a spoon connecting end and an elongated handle section; the spoon connecting end having a pair of spaced upwardly extending spoon/film structure securing spikes having enlarged tip end portions spaced and which are positioned to extend through the spaced securing holes of the sealed plastic film structure; the elongated handle section being sized to receive on film structure support surface thereof the sealed plastic film structure and including a compression mechanism having a compression member in slidable connection with the elongated handle section and positioned away from film structure support surface such that the compression member is slidable toward the spoon connecting end to generate a compressing force against the sealed plastic film structure positioned between the film structure support surface and the compression member of sufficient magnitude to force food from the inner compartment out through the dispensing opening; the spoon bowl assembly including an attachment structure including a dispensing opening receiving cavity formed into a handle contacting surface thereof, a spoon bowl in fluid communication with the dispensing opening receiving cavity through a bowl feed passageway formed between the spoon bowl and the dispensing opening receiving cavity and a pair of spaced spoon assembly connecting passageways spaced and dimensioned to receive therethrough the enlarged tip end portions of the spoon/film structure securing spikes such that the attachment structure is firmly held in place to provide a compressing gripping force against the sides of the sealed plastic film structure; food from the inner compartment being forced out of the sealed plastic film structure into the spoon bowl through a bowl opening of the bowl feed passageway.
Figure 2:
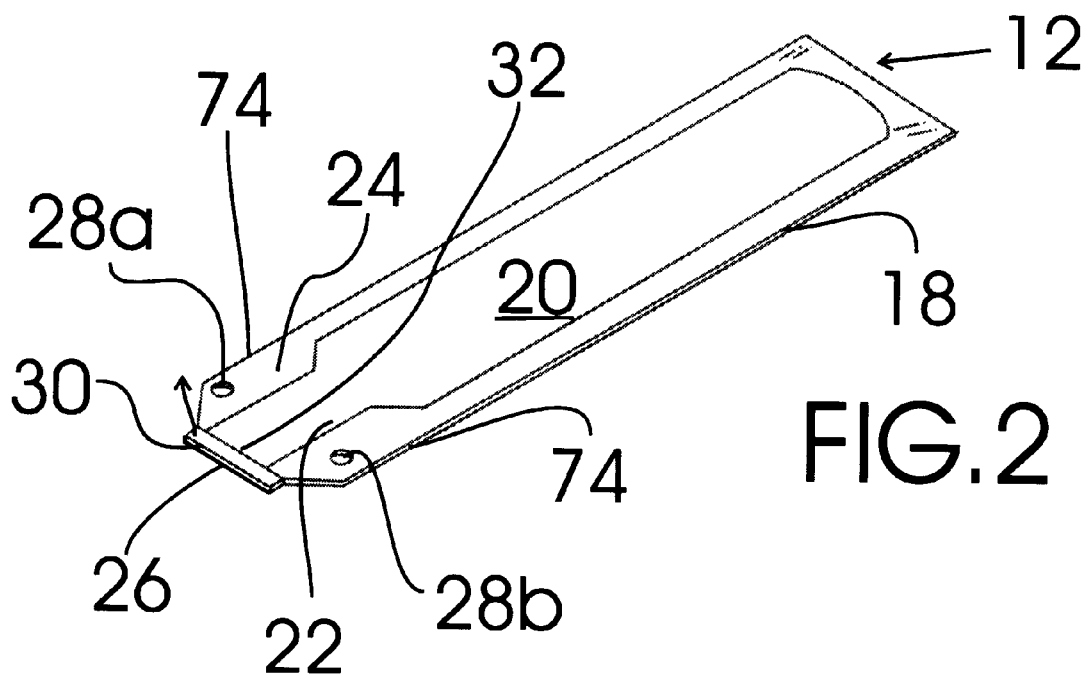
FIG. 2 is perspective view of an exemplary embodiment of the food package assembly in isolation.
Figure 3:
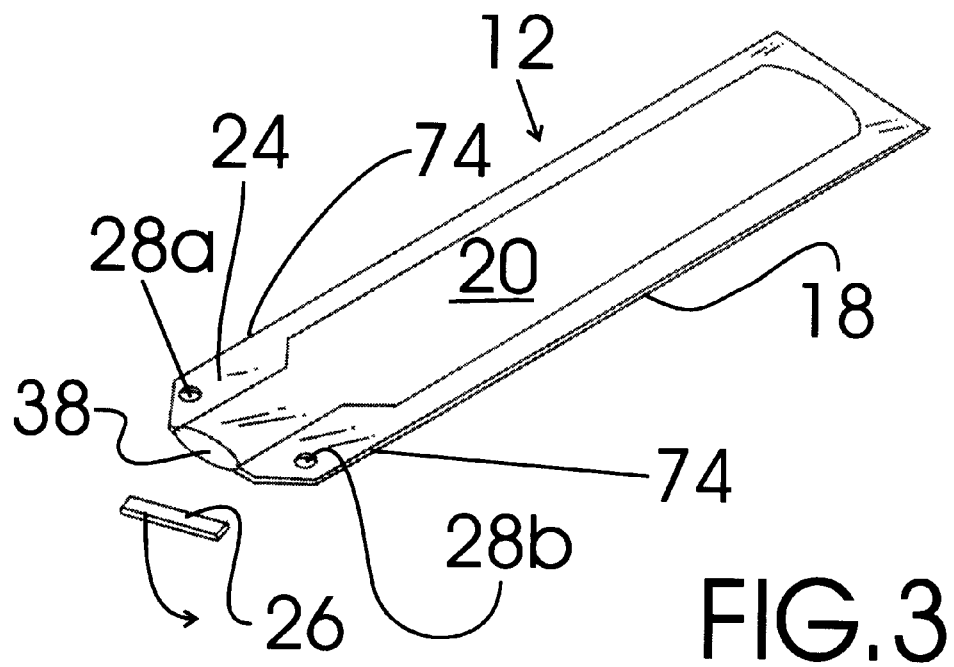
FIG. 3 is perspective view of an exemplary embodiment of the food package assembly in isolation showing the food package assembly with a tab portion of the handle connecting end torn away to form the dispensing opening in connection with the tapered interior compartment end of the inner compartment.

FIGS. 1–6 show various aspects of an exemplary embodiment of the food dispensing feeding system of the present invention generally designated 10. Food dispensing feeding system 10 includes a food package assembly, generally designated 12; a handle assembly, generally designated 14; and a spoon bowl assembly, generally designated 16.

Food package assembly 10 includes a sealed plastic film structure 18 having an inner compartment 20 filled with a food product that has a tapered interior compartment end 22 adjacent to a handle connecting end 24 of sealed plastic film structure 18 that is provided with spaced securing holes 28a,28b (one formed through a solid section of the sealed plastic film structure on each side of tapered interior compartment end 22) and a tear notch 30 positioned between a tab portion 26 of handle connecting end 24 and a line connecting the spaced securing holes such that, when tab portion 26 of handle connecting end 24 is grasped and torn away from sealed plastic film structure along a line 32 beginning at the vertex of tear notch 30 and parallel to tab portion 26, a dispensing opening 38 is formed in connection with the tapered. interior compartment end 22 of inner compartment 20 and spaced securing holes 28a, 28b remain part of sealed plastic film structure 18.

Handle assembly 14 includes a spoon connecting end 40 and an elongated handle section 42. Spoon connecting end 40 has a pair of spaced upwardly extending spoon/film structure securing spikes 44 each having an enlarged tip end portion 46. Securing spikes 44 are spaced, sized and positioned to extend through the spaced securing holes 28a, 28b of sealed plastic film structure 18 to hold it in place. Elongated handle section 42 is sized and shaped to receive on a film structure support surface 50 thereof sealed plastic film structure 18 after it is secured to securing spikes 44. Elongated handle portion 42 also includes a compression mechanism, generally designated 56, having a rollable compression member 58 that is slidable along elongated handle section and across film structure support surface 50 such that the compression member 58 is rollably slidable toward spoon connecting end 40 to generate a compressing force against a sealed plastic film structure 18 positioned between film structure support surface 50 and compression member 58 of sufficient magnitude to force food from inner compartment 20 out through dispensing opening 38. Although the compression assembly in this embodiment includes a rollable compression member 58 that is slidable along a trackway 67, it should be understood that the compression assembly can take any form including the finger of the user which is capable of compressing sealed plastic film structure 18 to force the food out of inner compartment 20 into spoon bowl 66 without departing from the spirit or the scope of the invention taught and claimed herein.

Spoon bowl assembly 16 includes an attachment structure, generally designated 60 including a dispensing opening receiving cavity 62 formed into a handle contacting surface 64 thereof, a spoon bowl 66 in fluid communication with dispensing opening receiving cavity 62 through a bowl feed passageway 68 (shown in dashed lines) formed between spoon bowl 66 and dispensing opening receiving cavity 62. Attachment structure 60 also includes a pair of spaced spoon assembly connecting passageways 70 that are spaced and dimensioned to receive therethrough the enlarged tip end portions 46 of spoon/film structure securing spikes 44 such that the attachment structure 60 is firmly held in place to provide a compressing gripping force against sides 74 of sealed plastic film structure 18.

In use, food 84 packaged within inner compartment 20 is forced out of sealed plastic film structure 18 into spoon bowl 66 through a bowl opening 80 of bowl feed passageway 68 as compression assembly 56 is forced toward spoon connecting end 40 by the user to dispense quantities of the food into the spoon bowl 66 as need.

It can be seen from the preceding description that a food dispensing feeding system has been provided.

It is noted that the embodiment of the food dispensing feeding system described herein in detail for exemplary purposes is of course subject to many different variations in structure, design, shape, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A food dispensing feeding system comprising:

a food package assembly;

a handle assembly; and a spoon bowl assembly;

said food package assembly including a sealed structure having an inner compartment filled with a food product that has an interior compartment end adjacent to a handle connecting end of said sealed structure provided with a securing structure formed in connection with a solid section of said sealed structure of said interior compartment end and a tear notch positioned between said handle connecting end and said interior compartment such that, when said handle connecting end is grasped and torn away from said sealed structure, a dispensing opening is formed in connection with said interior compartment end of said inner compartment and said securing structure remains a part of said sealed structure;

said handle assembly including a spoon connecting end and an elongated handle section;

said spoon connecting end having an attachment mechanism;

said elongated handle section being sized to receive on a support surface thereof said sealed structure;

said spoon bowl assembly including an attachment structure, a dispensing opening receiving cavity formed into a handle contacting surface thereof, a spoon bowl in fluid communication with said dispensing opening receiving cavity through a bowl feed passageway formed between said spoon bowl and said dispensing opening receiving cavity, said attachment structure being securable to said attachment mechanism of said handle assembly such that said spoon bowl assembly is firmly held in place to provide a compressing gripping force for holding said securing structure of said sealed structure;

food from said inner compartment being forced out of said sealed structure into said spoon bowl through a bowl opening of said bowl feed passageway.

2. The food dispensing feeding system of claim 1 wherein:

said elongated handle section of said handle assembly further includes a compression mechanism having a compression member in slidable connection with said elongated handle section and positioned away from film structure support surface such that said compression member is slidable toward said spoon connecting end to generate a compressing force against said sealed structure positioned between said film structure support surface and said compression member of sufficient magnitude to force food from said inner compartment out through said dispensing opening.

3. The food dispensing feeding system of claim 1 wherein:

said elongated handle section of said handle assembly further includes a compression mechanism having a compression member in slidable connection with said elongated handle section and positioned away from film structure support surface such that said compression member is slidable toward said spoon connecting end to generate a compressing force against said sealed plastic film structure positioned between said film structure support surface and said compression member of sufficient magnitude to force food from said inner compartment out through said dispensing opening.

4. A food dispensing feeding system comprising:

food package assembly;

a handle assembly; and a spoon bowl assembly;

said food package assembly including a sealed plastic film structure having an inner compartment filled with a food product that has a tapered interior compartment end adjacent to a handle connecting end of said sealed plastic film structure provided with a securing structure including spaced securing holes one formed through a solid section of said sealed plastic film structure on each side of said tapered interior compartment end and a tear notch positioned between said handle connecting end and a line connecting said spaced securing holes such that, when said handle connecting end is grasped and torn away from said sealed plastic film structure along a line beginning at said vertex of said tear notch and parallel to said handle connecting end, a dispensing opening is formed in connection with said tapered interior compartment end of said inner compartment and said spaced securing holes remain part of said sealed plastic film structure;

said handle assembly including a spoon connecting end and an elongated handle section;

said spoon connecting end having an attachment mechanism including a pair of spaced upwardly extending spoon/film structure securing spikes having enlarged tip end portions spaced and which are positioned to extend through said spaced securing holes of said sealed plastic film structure;

said elongated handle section being sized to receive on film structure support surface thereof said sealed plastic film structure;

said spoon bowl assembly including an attachment structure including a dispensing opening receiving cavity formed into a handle contacting surface thereof, a spoon bowl in fluid communication with said dispensing opening receiving cavity through a bowl feed passageway formed between said spoon bowl and said dispensing opening receiving cavity and a pair of spaced spoon assembly connecting passageways spaced and dimensioned to receive therethrough said enlarged tip end portions of said spoon/film structure securing spikes such that said attachment structure is firmly held in place to provide a compressing gripping force against said sides of said sealed plastic film structure;

food from said inner compartment being forced out of said sealed plastic film structure into said spoon bowl through a bowl opening of said bowl feed passageway.

\* \* \* \* \*